June 26, 1956 G. H. L. DUREAU 2,752,507

DEVICE FOR DECODING OF CODED ELECTRIC PULSES

Filed Nov. 3, 1954 2 Sheets-Sheet 1

June 26, 1956 G. H. L. DUREAU 2,752,507

DEVICE FOR DECODING OF CODED ELECTRIC PULSES

Filed Nov. 3, 1954 2 Sheets-Sheet 2

2,752,507

DEVICE FOR DECODING OF CODED ELECTRIC PULSES

Gabriel Henri Leon Dureau, Le Perreux, France, assignor to Societe Alsacienne de Constructions Mecaniques, Paris, France Application November 3, 1954, Serial No. 466,600

3 Claims. (Cl. 250—27)

The present invention relates to a decoding device for decoding of periodically recurring coded pulse groups. More specifically, it relates to a decoding device for a coded pulse group communication system in which an intelligence wave, the instantaneous amplitude of which has one of $2^n$ possible values, is transmitted, at the sending end of a communication link, with the aid of the coding device described in the United States Patent 2,646,548, filed July 9, 1949, Serial No. 103,904, by J. A. Ville, A. P. Pages and P. A. Herreng.

It will first be recalled that the communication system described in the said patent makes use of a special coding method, different from those used in most known coded pulse systems. While having in common with the latter the use of coded pulse permutation groups consisting of an integer number $n$ of consecutive signals of one or the other of two possible signalling conditions, there is no simple correspondence law, in the method of the said patent, between the particular amplitude value represented by a given coded group and its composition written as a binary number by conventionally substituting zero or unity respectively for one and the other of the possible signalling conditions of its individual signals.

In the coding method described in the said patent, the adopted correspondence law consists in arranging all said $2^n$ possible amplitude values in their increasing (or decreasing) magnitude order, and in causing each one of the said amplitudes to correspond, according to its rank, to a coded pulse group of equal rank taken in an ideal basic pulse sequence consisting of $2^n+(n-1)$ coded signals, the composition of which is such that any group of $n$ consecutive pulses taken in said sequence be different from any other. It has been shown, in the said patent, that such a sequence may effectively be built.

While the just described coding method involves certain decoding difficulties, its advantage is, as shown in the said patent, that when an electron beam coder tube is used, it is possible to build this tube in a much simpler way than the case would be with conventional coding methods.

For convenience, the signalling condition of a pulse will be hereinafter referred to as its "polarity"; that is, a pulse will be called "positive" or "negative," according to its signalling condition. This implies no limitation in the actual composition of the pulse groups and sequences involved in the practical embodiment of the invention, as there are many devices known in the art for transforming any two-signalling condition pulse series into a corresponding series of pulses of positive and negative polarities.

The operating principle of the decoding device, the object of the invention, consists in physically producing, on the arrival of a coded pulse group at the receiving end of a communication link, a number $n$ of pulse sequences properly staggered in time and the composition of each one of which is identical with that of the said basic sequence or with that of the complementary sequence obtained by reversing the signalling condition of every individual pulse in the said basic sequence, according to the particular signalling condition of the various successive pulses constituting the received group. When all of the said $n$ sequences simultaneously exhibit pulses of the same signalling condition, a derived pulse is produced, the time position of which depends on the composition of the said received group. It has already been shown, for instance in the United States Patent 2,685,647, filed August 3, 1954, Serial No. 279,442, by A. P. Pages and G. M. L. Dureau, that such a derived pulse is time-position modulated proportionally to the rank of the considered code group in the said basic sequence, and that it is therefore sufficient to demodulate it for its time modulation for obtaining a decoded signal reproducing the original intelligence wave.

According to a feature of the invention, the various above-mentioned pulse sequences are time-staggered with respect to each other by a constant time interval equal to that separating the instants of appearance of any two consecutive pulses in one of the said sequences, this being effected with the aid of conventional delay networks.

According to another feature of the invention, the polarity reversal through which anyone of the said sequences is changed to the above-defined complementary sequence is obtained through the agency of dry rectifiers in Wheatstone bridge connection.

According to still another feature of the invention, occurrence of simultaneously identical polarities of pulses in the various sequences is detected with the help of a summation device delivering a signal of maximum amplitude only when such a simultaneous identity condition exists.

According to a preferred embodiment, the decoding device of the invention comprises essentially means for applying all the pulses received to a synchronizing pulse selector, a generator of a synchronized periodic saw tooth voltage, synchronized by synchronizing pulses selected by said selector, means for further applying said assembly of received pulses to a first delay network provided with $n$ taps staggered in such a manner that the time of propagation between two consecutive taps be equal to the duration of each one of the pulses in one of said groups, means for generating, from said selected synchronizing pulses, control periodic pulses actuating $n$ storing devices to which are respectively and simultaneously applied the electric voltages present at said $n$ taps of said first delay network, each one of said storing devices supplying at its output a control voltage having one or the other of two constant predetermined values according to the value of the voltage present at that one of said taps to which it is connected at the time of the generation of said control pulses, an electron tube generator controlled by said saw tooth voltage and generating periodically, within a time at most equal to the duration of one of said groups a basic sequence of $2^n+(n-1)$ signals with equal individual durations, and each one of which consists in the presence or absence of a pulse, said sequence of $2^n+(n-1)$ signals having such a composition that any group of $n$ consecutive signals taken in said sequence be different, means for applying said signal sequence to a polarity converter transforming it into a sequence of $2^n+(n-1)$ pulses having one or the other of two opposite polarities corresponding respectively to the presence or absence of a pulse in said signal sequence, a second delay network energized by said transformed pulse sequence and provided with a number $n$ of taps staggered in such a manner that the time of propagation between two consecutive taps be equal to the duration of one pulse of said transformed sequence, $n$ voltage reversers, respectively energized, on the one hand by the voltage generated at each one of said $n$ taps of the second delay network and on the other hand by the control voltage produced at the output of one of said storing devices, each one of said voltage reversers delivering, at its output, according to the value of said control voltage a sequence of pulses identical with said transformed sequence or with a complementary sequence obtained by reversing the polarity of each pulse in said transformed sequence, a summation device comprising *n* inputs, respectively energized by the *n* outputs from said voltage reversers and supplying to a resistance a resulting pulse only when the pulse voltages from all *n* reversing devices are all simultaneously of one predetermined polarity, means for applying said resulting pulse to a demodulator for pulses modulated in position in time, means for deriving from said synchronizing pulses issuing from said selector periodic release signals having a substantially rectangular wave shape and for applying them so as to make said demodulator active only for the duration of said release signals and means for applying the demodulated signals from said demodulator to a utilization circuit.

The present invention is described in greater detail hereinafter with reference to the appended drawing illustrating an example of an embodiment and wherein.

Figure 1:
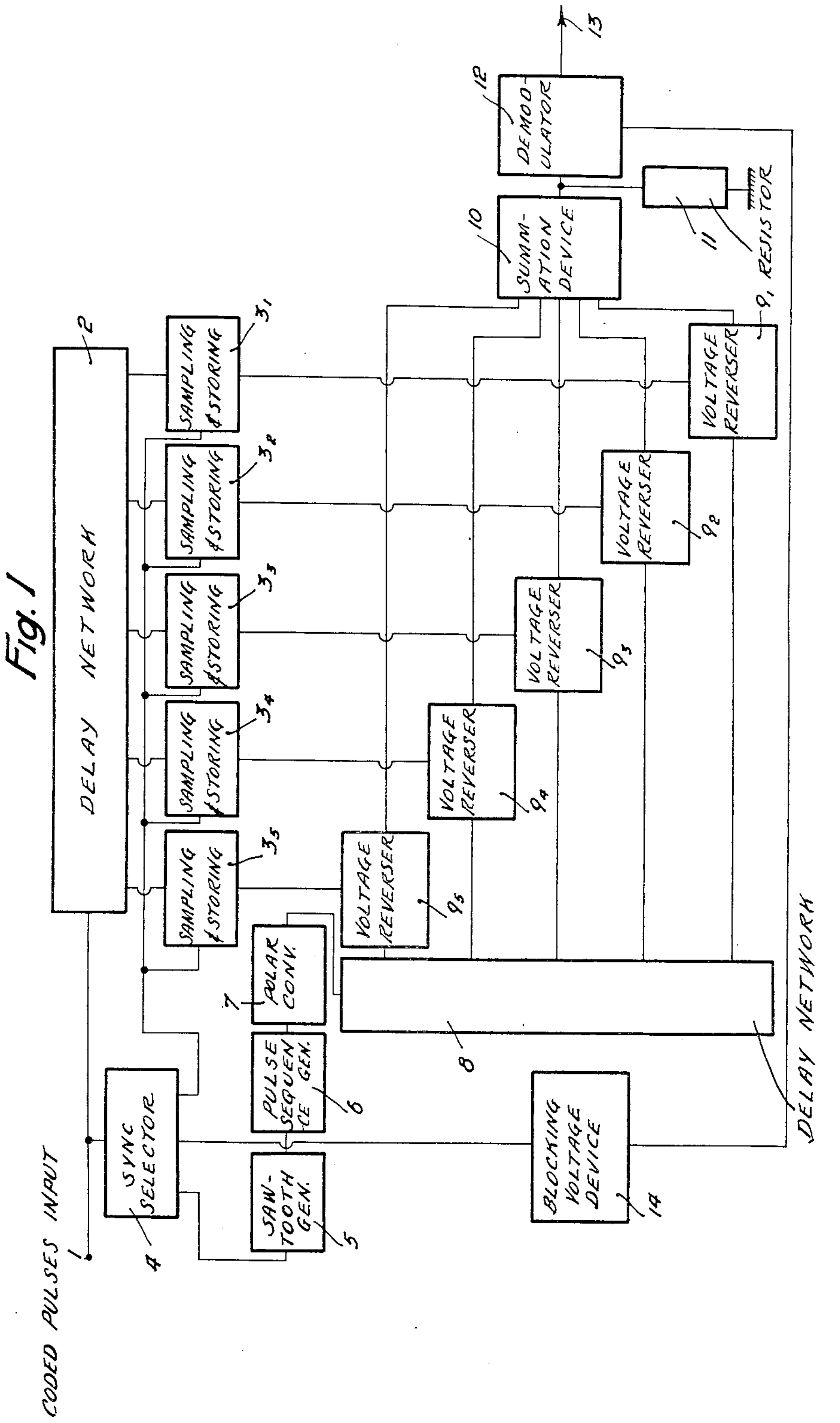
Figure 1 shows, diagrammatically, a receiving system for five pulse coded groups, comprising polarity reversers and a summation device according to the invention.

Referring to Fig. 1 there is shown an input terminal 1 for the groups of coded pulses and synchronizing pulses which are received periodically from sending equipment not shown. It has been assumed, by way of example, that each group of coded pulses comprises five pulses, each one of which can be present or absent, individually, in accordance with the code used at the sending end. These groups are applied to a delay network 2, through which they pass. This network is terminated, at the other end, on a reflectionless impedance and comprises five intermediate taps. $3_1$ to $3_5$ represent five devices for the sampling and storing of voltages, provided with input terminals called "main" terminals hereinafter. Such devices are well known in the technique of telecommunications.

4 represents a synchronization selector device which selects the synchronization pulses and derives therefrom control pulses which are applied, on the one hand, to the devices $3_1$ to $3_5$, and, on the other hand, serve for synchronizing a generator 5 supplying a periodic voltage with a linear saw tooth wave shape. 6 represents a sequence pulse sequence generator comprising essentially an electronic tube of the type described in the U. S. Patent No. 2,646,548, the principle of which was recalled in the introduction to the present description. 6 is connected, on the one hand, with the saw tooth voltage generator 5 and, on the other hand, with a device 7 which is a polarity converter and possibly a pulse shaper. 7 supplies a delay network 8 similar to 2 and comprising also 5 intermediate taps connected respectively to the main input terminals of five voltage reverser devices $9_1$ to $9_5$, the output terminals of which are connected with a device 10 hereinafter called a "summation device." Auxiliary input terminals for the reversers 9 are connected, respectively, with the output terminals of the sampling and storing devices $3_1$ to $3_5$.

11 represents a resistance energized by the summation device 10, and 12 a demodulating device for the pulses collected at the terminals of the summation resistance 11. Finally, 13 designates the output terminals of the assembly receiving the decoded signal to be applied to a utilization circuit.

14 represents a device energized by the synchronization selector 4 and which supplies an auxiliary control voltage applied to the demodulator 12. This device operates as follows:

The synchronization selector 4 receives at the same time the group pulses and the synchronization pulses; it selects the latter and generates from each one of them two control pulses offset in time with respect to each other. One of these control pulses is applied to the voltage sampling and storing devices $3_1$ to $3_5$, at the precise moment when the voltage peaks of the five pulses of the received group pass through the delay network 2 to the taps carried by said network. The taps on network 2 are located in such a manner that when the peak of one pulse passes at the location of the tap most distant from the network input, the four next pulses pass exactly at the locations of the other taps. This control pulse actuates simultaneously the elements which, in the devices $3_1$ to $3_5$, cause the sampling of the voltage existing at that instant across their main input terminals. The peak voltages of the passing pulses, different from zero for some of them, equal to zero for the others, are thus sampled.

Each one of the devices $3_1$ to $3_5$ comprises, in addition, voltage storing elements which supply a voltage remaining constant up to the instant of the next voltage sampling. These storing elements are so arranged as to give this constant voltage one or the other of two suitably chosen values for orienting as will be set forth the reversing devices $9_1$ to $9_5$ in one direction or the other according to whether the sampled voltage was zero or not. The reversing devices $9_1$ to $9_5$ are so arranged as to transfer the voltages applied at their input terminals with or without reversing their polarities according to the value of the voltage given by the corresponding device $3_1$ to $3_5$.

The second control pulse, suitably positioned in time, is applied to the periodic saw tooth generator 5, the voltage of which is applied to the deflecting plates of the pulse generating tube of the pulse sequence generating device 6. The time position of the control pulse from 4 is such that the linear scanning of the anode and mask electrode of the tube, and, consequently the generating of the pulse sequence is effected after the reversers $9_1$ to $9_5$ have already been oriented respectively by the devices $3_1$ to $3_5$ as explained. The pulse sequence generated by 6 is applied to the converter 7. It has been mentioned that the pulses of the basic sequence generated by 6 are individually characterized by their presence or absence. The main function of the converter 7 is to restore pulses characterized by their polarities, the pulses different from zero which are applied thereto being converted, for instance, into positive pulses and the other ones into negative pulses. 7 has, further, as a secondary function, to increase the durations of the pulses so that several consecutive present pulses be transformed into a single pulse having a duration equal to the sum of the durations of the component pulses and to give them a wave shape substantially rectangular. The sequence is thus restored in the shape of a stepped voltage wave with steps of irregular durations comprising flat, positive or negative portions at a constant level connected by very sudden transitions. The pulse sequence thus obtained goes through the delay network 8 in which the intermediate taps are so arranged that when an individual pulse passes at the location of the tap most distant from the input to the network the four next pulses pass exactly at the locations of the other taps. A fraction of the energy of these pulses goes through each one of the connections extending from said taps to the voltage reversers $9_1$ to $9_5$ which are thus gone through by transformed pulse sequences each one of which is delayed with respect to the previous one by the duration of one pulse. The reversers 9 oriented in their direct positions restore the sequence which is applied to them; the other ones restore it after they have transformed the positive pulses into negative pulses and conversely.

The five transformed sequences, reversed or not, are applied to the summation device 10, which has a double function: a conversion function which consists in transferring to the resistance 11 pulses of one polarity only, the pulses of opposite polarity being replaced by zero pulses, and a clipping function which consists in limiting the voltage at the terminals of said resistance 11 to a value equal at most to that generated by a single pulse.

The voltage across the terminals of the resistance 11, therefore, is constant during the applications of the sequences, except for the duration of one pulse. There is thus obtained, across the terminals of the resistance 11 a voltage pulse having a polarity opposite that of the voltage thus interrupted.

The purpose of the device 14 is to elaborate a periodic "blocking" voltage which, alternately, renders inoperative and releases the demodulator 12 during suitably chosen time intervals for preventing the transmission of untimely signals by said demodulator during the unused portion of each cycle of operations. This device, of any known type must be under the control of the synchronization device.

There is thus generated one pulse after the receiving of each group of coded pulses, and the instant of occurrence of this pulse depends on the particular combination of the group and characterizes it. The same operating cycle being repeated after the receiving of each group, the reversers 9 being oriented at each cycle according to the combination corresponding to each one of these groups, a sequence of recurring pulses modulated in their time positions with respect to fixed reference instants, for instance the beginnings of the successive groups, is thus obtained. Usual devices for the demodulation of such pulse sequences are well known: 10 will be such a device and will deliver at its output terminals, 13 a signal having a continuously variable voltage as a function of time, which is the decoded signal.

Figure 2:
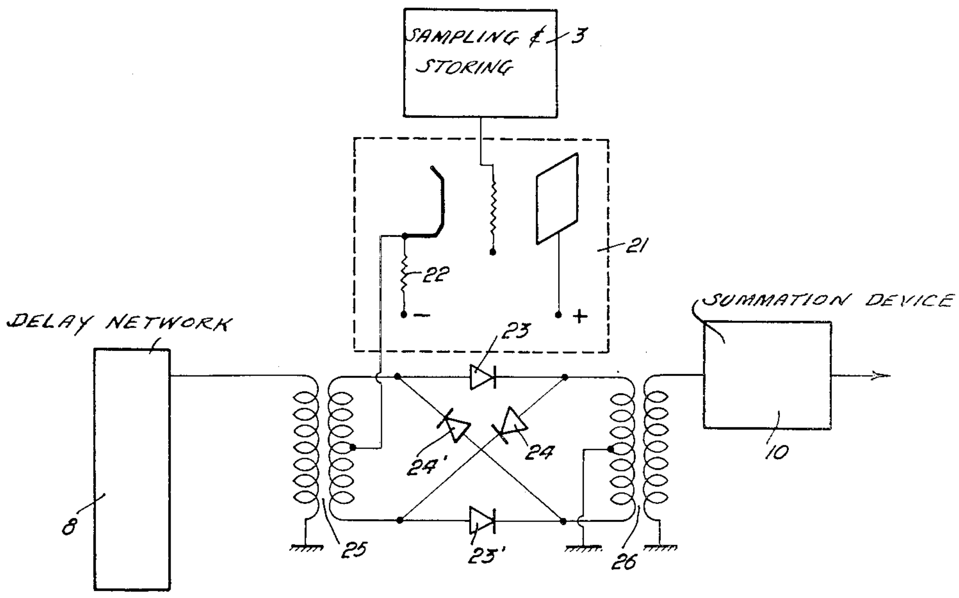
Figure 2 shows a preferred type of embodiment of the electronic reversing device.

In Fig. 2, the numeral 3 designates, as in Fig. 1, one of the sampling and storing devices. Similarly 8 represents the delay network which distributes in time the 5 basic sequences generated by the tube of the pulse sequence generator and 10 is the summation device.

The voltage stored in 3 which, as has been explained, as a different value according to whether the corresponding pulse existed or not, is applied to a pulse amplifying stage 21, with a cathode load, comprising a tube, in the cathode circuit of which are inserted, on the one hand a resistance 22 in series with a negative voltage source and on the other hand the control circuit for an electronic reverser of a known type, comprising essentially four rectifier elements 23, 23', 24, 24', connected in a Wheatstone bridge between two transformers 25, 26. Said control circuit, one end of which is connected with the cathode of the tube 21 and the other one to a fixed potential point called a "ground" is connected to the midpoint of the transformers connected with the rectifier elements assembled according to the known arrangement of the ring modulator. The other winding of the transformer 25 is connected to one terminal of the delay network 8 and that of the transformer 26, to the summation device 10.

This device, well known in itself, operates as follows: according to the value of the voltage stored in 3, the amplified current flows in the control circuit for the electronic reverser in one or the other direction. In one direction, this current makes the rectifier elements 23, 23' conducting and the elements 24, 24', non-conducting. In the other direction 23, 23' are non-conducting and 24, 24' are conducting.

The pulses of the basic sequence, issuing from 8 and transmitted without any appreciable deformation by the transformer 25 suitably arranged, thus pass either through the rectifier elements 23 and 23' or through the elements 24, 24' before being transmitted to the summation device 10 by the transformer 26. They thus reach 10 either with one polarity or with the other one and this polarity depends on the voltage stored in 3.

Figure 3:
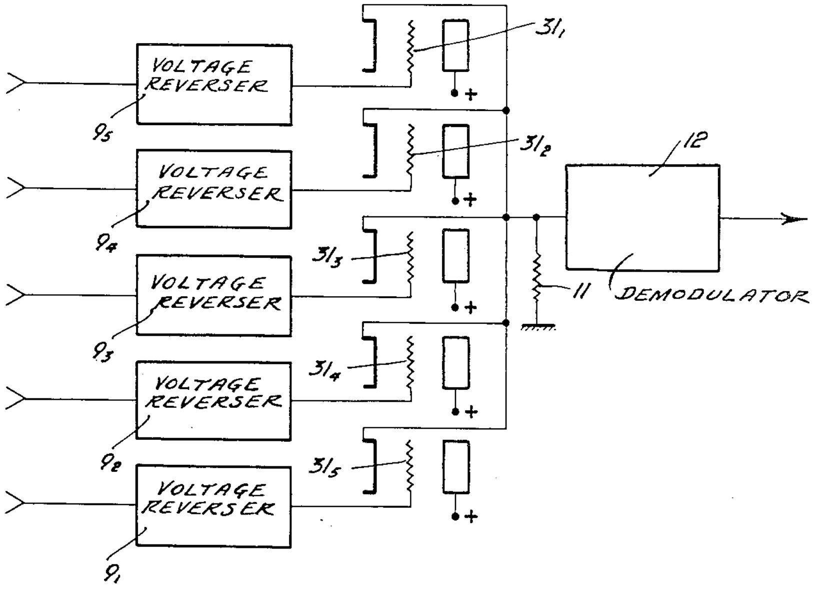
Figure 3 shows a preferred type of embodiment of the summation device.

Fig. 3 illustrates a preferred embodiment of the summation device 10 shown in Fig. 1.

In Fig. 3 there is illustrated, with the same numerals used in Fig. 1, the five electronic reversers $9_1$ to $9_5$, the summation resistance 11 and the demodulator 12.

The transformed pulse sequences, reversed or not, according to the combination received, by the reversers $9_1$ to $9_5$, are applied respectively to the control grids $31_1$ to $31_5$ of five tubes. These tubes are arranged as amplifiers with loads in the cathode circuit with a common load resistance which is the summation resistance 11 with a value high enough for the intensity of the anode current through each tube, in the absence of a positive voltage applied to the control grid be very small.

The voltages applied to the control grids of the tubes undergo, as has been explained, sudden polarity reversals. When a negative voltage happens to be applied to one of the grids, its anode current becomes zero. On the other hand, when the voltage applied to the grid is positive, the anode current assumes a comparatively high value. Each tube thus contributes, in an intermittent manner, in supplying a current going through the common cathode resistance 11, but, since the value of this resistance is high, the feedback effect levels the current delivered by the assembly of the tubes, the control grids of which are subjected simultaneously to positive voltages, to an intensity which depends very little on the number of tubes which at all instants contribute in the supply of current. The voltage across the terminals of the summation resistance 11 is thus substantially constant, except if the voltages applied to the five control grids are simultaneously negative, in which case all anode currents are zero, and the voltage across the terminals of 11 also is zero. As already explained, this occurs only for the duration of one pulse of the basic or complementary sequences applied to the grids of the tubes. The vanishing of the voltage across the terminals of the resistance 11 for the duration of a single pulse of the pulse sequences applied to 10 constitutes the signal which is transmitted to the pulse demodulator 12.

What I claim is:

1. A decoding device for recurring electric coded pulse groups, comprising means for receiving periodic synchronization pulses transmitted together with said coded pulse groups, means for applying all the received pulses to a synchronization pulse selector, a generator of a periodic saw tooth voltage synchronized by synchronization pulses selected by said selector, means for further applying the whole of said received pulses to a first delay network provided with $n$ taps, staggered along said network in such a manner that the time of propagation between two consecutive taps be equal to the duration of one of said coded pulses, means for producing from said selected synchronization pulses, periodic control pulses actuating $n$ storing devices, to which are respectively and simultaneously applied the electric voltages present at said $n$ taps of said first delay network, each of said storing devices delivering at its output a control voltage having one or the other of two predetermined constant values according to the value of the voltage present at that one of said taps to which it is connected at the time of generation of said control pulses, an electronic tube generator controlled by said saw tooth voltage and generating periodically, within a time at most equal to the duration of one of said groups, a basic sequence of $2^n+(n-1)$ signals with equal individual durations and each one of which consists in the presence or absence of a pulse, said basic sequence of $2^n+(n-1)$ signals having such a composition that any group of $n$ consecutive signals taken in said sequence be different, means for applying said signal sequence to a polarity converter transforming it into a sequence of $2^n+(n-1)$ pulses having one or the other of two opposite polarities according to the presence or absence of one pulse in said signal sequence, a second delay network supplied by said transformed pulse sequence and provided with a number $n$ of taps so staggered along said second network that the time of propagation between two consecutive taps be equal to the duration of one pulse in said transformed sequence, *n* voltage reversers, respectively supplied, on the one hand by the voltage produced at each one of said *n* taps of said second delay network and on the other hand by the control voltage produced at the output of one of said storing devices, each one of said voltage reversers delivering, at its output, according to the value of said control voltage, a pulse sequence identical with said transformed sequence or a complementary sequence obtained by reversing the polarity of each pulse in said transformed sequence, a summation device comprising *n* inputs respectively energized by the *n* outputs of said voltage reversers, and delivering to a resistance a resulting pulse only when the voltages of pulses from all said *n* reversing devices are all simultaneously of one predetermined polarity, means for applying said resultant pulse to a demodulator for pulses modulated in their time positions, means for deriving from the synchronization pulses from said selector periodic release signals with a substantially rectangular wave shape and for applying them so as to make said demodulator active only for the duration of said release signals and means for applying the demodulated signals from said demodulator to a utilization circuit.

2. A device as claimed in claim 1, wherein each of said voltage reversers comprises a pulse amplifying stage with an electron tube the cathode of which is connected, on the one hand with a load consisting of a resistance in series with a source of negative voltage, and on the other hand with the mid-point of the secondary winding of a transformer, the primary winding of which is connected with said second delay network and ground, the terminals of said secondary winding being connected with the terminals of the primary winding of a second transformer the mid-point of which is grounded and the secondary winding of which is connected with said summation device and ground, rectifier elements being arranged, in the same direction, in series between the terminals of said secondary winding of said first transformer, and those of said primary winding of said second transformer and rectifier elements being arranged in the same direction with respect to one another, between one terminal of one of said rectifier elements arranged in series and the opposite terminal of the other one of said rectifier elements arranged in series, the control grid of said electron tube being connected with the output from one of said storing devices.

3. A device as claimed in claim 1, wherein said summation device is constituted by electron tubes, in number equal to that of the voltage reversers, the control grid of each of which is connected with the output from the voltage reverser with which it cooperates, and the cathodes of which are connected to said demodulator on the one hand and to a common resistance load connected to ground on the other hand, the value of said resistance being high enough for the intensity of the anode current in each tube, in the absence of any positive voltage applied to its control grid, to be reduced to a very low value.

No references cited.